US008266008B1

(12) United States Patent
Siegel et al.

(10) Patent No.: US 8,266,008 B1
(45) **Date of Patent: *Sep. 11, 2012**

(54) FACILITATING A SUPPLY OF USED ITEMS

(75) Inventors: Hilliard Bruce Siegel, Seattle, WA (US); Paul G. Nordstrom, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,960

(22) Filed: Nov. 4, 2011

Related U.S. Application Data

(63) Continuation of application No. 11/504,157, filed on Aug. 15, 2006, now Pat. No. 8,073,740.

(51) Int. Cl.
*G06Q 30/00* (2006.01)

(52) U.S. Cl. ...................................... 705/26.1; 705/27.1

(58) Field of Classification Search ......... 705/26.1–27.2
See application file for complete search history.

(56) References Cited

U.S. PATENT DOCUMENTS

| | | | | |
|---|---|---|---|---|
| 6,658,390 | B1 * | 12/2003 | Walker et al. | 705/5 |
| 7,343,330 | B1 * | 3/2008 | Boesjes et al. | 705/28 |
| 2001/0029470 | A1 * | 10/2001 | Schultz et al. | 705/26 |
| 2002/0032668 | A1 | 3/2002 | Kohler et al. | 705/401 |
| 2002/0161644 | A1 * | 10/2002 | Duffield | 705/14 |
| 2004/0158503 | A1 * | 8/2004 | Gross | 705/26 |
| 2006/0136300 | A1 * | 6/2006 | Kopelman et al. | 705/14 |
| 2006/0161477 | A1 * | 7/2006 | Walker et al. | 705/14 |
| 2007/0299747 | A1 | 12/2007 | Shorter et al. | 705/28 |

OTHER PUBLICATIONS

Richard McComb Birmingham Post , 1st ed , p. 44 Saturday , Feb. 3, 2007.*

Challenges for deploying Web services-based e-business systems in SMEs. International Journal of E-Business Research , v 2, n 1 , p. 1 Jan. 2006.*

"DVDs: Trade Used DVD Movies Online," Peerflix, retrieved Aug. 15, 2006, from http://www.peerflix.com/Default.aspx?tabid=64, 2 pages.

"Evolution of an Envelope," Business 2.0 Magazine, Mar. 16, 2006, retrieved Jan. 16, 2008, from http://money.cnn.com/magazines/business2/business2_archive/2006/..., 1 page.

(Continued)

*Primary Examiner* — Jeffrey A Smith
*Assistant Examiner* — Resha Desai
(74) *Attorney, Agent, or Firm* — Seed IP Law Group PLLC

(57) ABSTRACT

Techniques are described for facilitating a supply of used items on behalf of an entity that desires to acquire such used items, such as a merchant that sells used items to customers. The used items are obtained based on interactions with recipients who receive items that are sold or otherwise provided by one or more merchants (or other suppliers of items), such as by supplying appropriate information and materials to the recipients along with the items. In some situations, when an item is delivered or otherwise supplied to a recipient by a merchant, the merchant also supplies information to the recipient that indicates an offer from a used item acquirer entity to re-acquire the item from the recipient (such as after the recipient has used the item) and shipping materials for use in returning the item to an indicated destination if the recipient accepts the offer.

20 Claims, 7 Drawing Sheets

OTHER PUBLICATIONS

"Evolution of an Envelope," retrieved Aug. 15, 2006, from http://static.flickr.com/19/116350888_abb501cc73_b.jpg, 1 page. "How it Works," Netflix, retrieved Aug. 15, 2006, from http://www.netflix.com/HowItWorks?lnkctr=nmhhiw, 2 pages.

"PeerMailer: How to Folder a PeerMailer," Peerflix, retrieved Aug. 15, 2006, from http://www.peerflix.com/Default.aspx?tabid=3040, 1 page.

"What is a PeerMailer?" Peerflix, retrieved Aug. 15, 2006, from http://www.peerflix.com/Default.aspx?tabid=3045, 1 page.

McComb, R., "In the Street Where Traders are Losing Fight to Survive It Should be one of Birmingham's Most Vibrant Shopping Districts, so Why is Harborne Having Such a Tough Time?" Birmingham Post, 1st Edition, Saturday, Feb. 3, 2007, p. 44.

* cited by examiner

FACILITATING A SUPPLY OF USED ITEMS

CROSS-REFERENCE TO RELATED APPLICATIONS

This application is a continuation of co-pending U.S. application Ser. No. 11/504,157, filed Aug. 15, 2006 and entitled "Facilitating a Supply of Used Items," which is hereby incorporated by reference in its entirety.

TECHNICAL FIELD

The following disclosure relates generally to techniques for facilitating a supply of used items, such as by requesting recipients of items sold by a merchant to return the items for use as used items by the merchant or a third party.

BACKGROUND

A variety of markets exist to supply items to customers or other recipients. For example, the World Wide Web (the "Web") has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. Some product items may be available to be delivered electronically to a recipient (e.g., music downloaded over the Internet), while other product items (e.g., paperback books) may instead be delivered through physical distribution channels (e.g., shipment via a governmental postal service or private common carrier). Similarly, some service items may be provided electronically (e.g., providing email service), while others may be provided physically (e.g., performing cleaning services at the purchaser's house). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

While many consumers desire new items, there is also substantial demand for used items. However, it is often difficult for a merchant or other supplier of used items to obtain a sufficient supply of used items. For example, a merchant or other supplier may face difficulties in identifying owners of used items who may be willing to sell or otherwise provide the used items to the merchant, as well as various costs in negotiating with the owners to obtain the used items. Similarly, even if owners of used items are interested in selling or otherwise providing their used items to others, various difficulties inhibit many such owners from actually making their used items available, such as due to difficulties in identifying interested buyers, negotiating with such buyers, arranging for transport of the items to the buyers, etc.

Thus, it would be beneficial to provide improved techniques for facilitating the supply of used items from owners of the items to used item providers or other potential recipients of the used items.

DETAILED DESCRIPTION

Figure 1A:
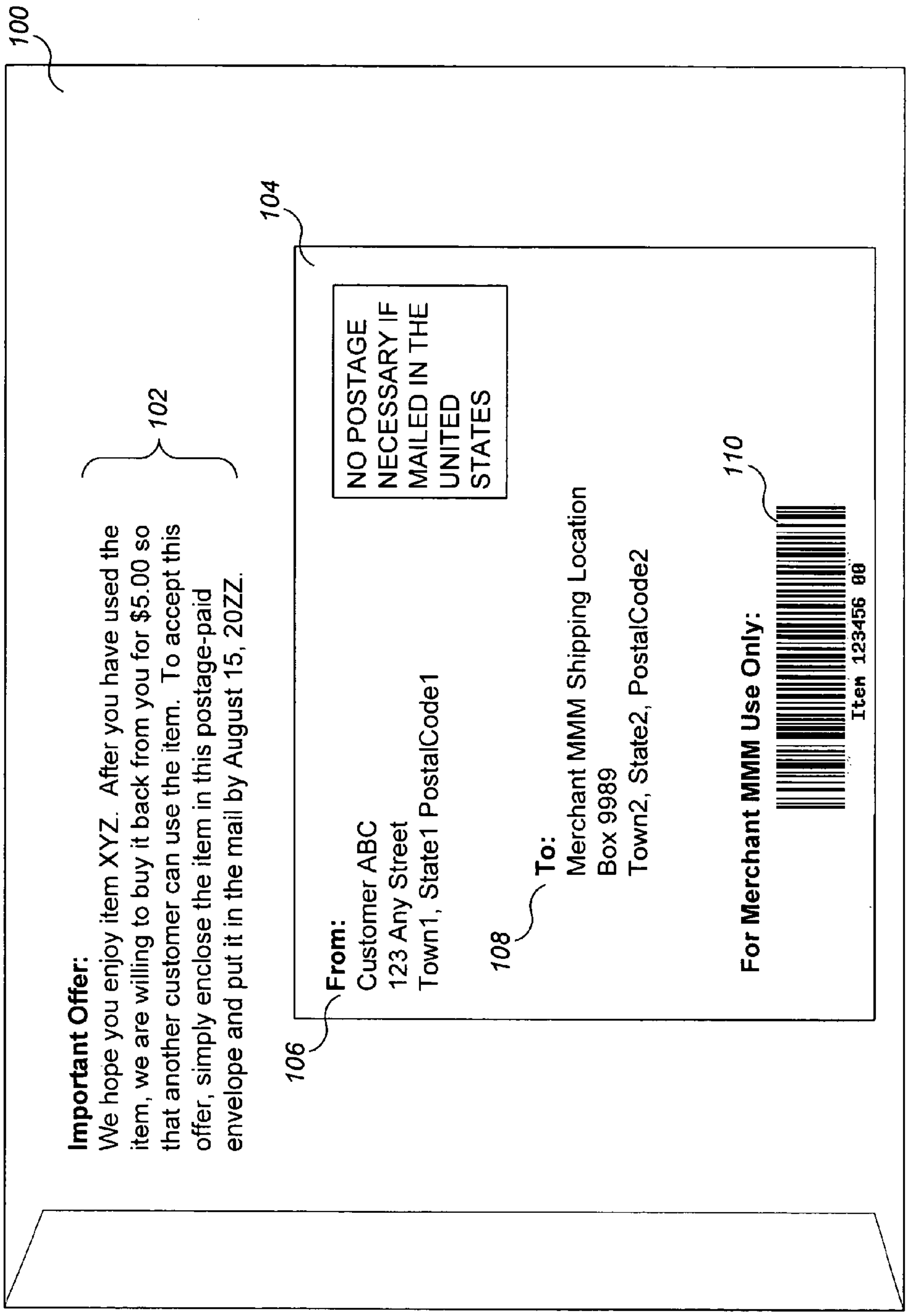
FIGS. 1A-1D illustrate examples of techniques for facilitating a supply of used items.

Techniques are described for facilitating a supply of used items on behalf of an entity that desires to acquire such used items, such as a merchant that sells used items to customers. The used items are obtained based on interactions with recipients who receive items that are sold or otherwise provided by one or more merchants (or other suppliers of items), such as by supplying appropriate information and materials to the recipients along with the items. In particular, at least some embodiments, when an item is delivered or otherwise supplied to a recipient by a merchant, the merchant also supplies information to the recipient that indicates an offer from a used item acquirer entity to re-acquire the item from the recipient, such as after the recipient has used the item. The information supplied to the recipient may have various forms in various embodiments, and may further be accompanied by shipping materials that are supplied to the recipient for use in returning the item to an indicated destination (e.g., a location associated with the used item acquirer) if the recipient accepts the offer to sell or otherwise provide the item to the used item acquirer. Thus, if the recipient elects to make the received item available to others as a used item, the recipient may merely accept the indicated offer and send the item to the used item acquirer using the supplied shipping materials.

The techniques for facilitating a supply of used items may be used in various manners in various embodiments. In some embodiments, a single merchant may both initially supply items to recipients and then subsequently act as a used item acquirer to re-acquire those initially supplied items for later use, such as if the merchant sells both new and used items. In other embodiments, a merchant who is initially supplying items to recipients may supply re-acquisition offers to the recipients on behalf of one or more used item acquirer entities other than the merchant (e.g., in exchange for a fee from the other entities). In addition, the recipient of an item may be the customer who purchased the item, or instead may be another designated recipient (e.g., if the item is purchased by the customer as a gift). Furthermore, in some embodiments the re-acquisition offers may be made in only certain circumstances, such as only for particular types of items (e.g., disk-based items, such as CDs, DVDs, computer software and games, etc.), particular classes of items (e.g., for initially supplied items that are new and/or that are already used), particular items (e.g., those with an actual or expected level of demand that is sufficiently high), particular recipients (e.g., those with whom a history of prior interactions or other information provides a level of confidence that they will send the items in good condition and without engaging in fraudulent activities), etc. Additional details are provided below with respect to situations in which the described techniques are used.

The shipping materials that are sent to a recipient along with an item may have a variety of forms in various embodiments. For example, the shipping materials may have pre-paid postage and be pre-addressed to a predetermined destination location, thus enabling the recipient to return the item by merely placing the item in the shipping materials, sealing the shipping materials, and providing the sealed materials to the postal service or other delivery service. The shipping materials may include envelopes, mailers, boxes or other containers that are made out of a variety of materials, including paper, paperboard, cardboard, plastic, etc. Additional details related to shipping materials are provided below.

The offer to a recipient to re-acquire an item may be communicated to the recipient in various ways in various embodiments. In some embodiments, at least some information about the offer may be specified to the recipient by printing or otherwise including an indication of the offer on the supplied shipping materials rather than on other supplemental materials, thus preventing such supplemental materials from being lost or separated from the shipping materials. The information about the offer on the shipping materials and/or other supplemental materials may include various offer terms, such as an acquisition price, a time period during which the offer is in effect, a manner of acceptance of the offer, etc. In addition, in some embodiments an offer may be only partially specified, such as if the specified information does not fully specify one or more offer terms (e.g., by specifying the price term as a range, as a minimum amount, as a maximum amount, or by indicating that the price will be determined based on conditions at the time of offer acceptance or of later use of the item). Alternatively, the information that is supplied about the offer (whether on the shipping materials or separately supplied) may include an instruction to the recipient to access information to obtain additional offer terms and information, such as by indicating a Web page with a provided URL ("Uniform Resource Locator") or by indicating a telephone number to be called. Additional details related to offers are provided below.

When an initially supplied item is re-acquired from a recipient, the re-acquired item may be used in various ways in various embodiments. For example, in some embodiments the used item acquirer may re-sell the item as a used item, while in other embodiments the used item may be employed in other manners (e.g., as a rental item). In addition, while in some embodiments the initially supplied items are re-acquired from the recipients via purchase transactions, a variety of other types of acquisition transactions may be used in other embodiments, such as to rent the items from the recipients, to handle the items on consignment from the recipients, etc. Moreover, in some embodiments the re-acquired items may ultimately be returned to the original recipient after use by the used item acquirer, such as if the re-acquired item is used by the used item acquired as a rental item for an agreed-upon time period or until other specified conditions are satisfied.

For illustrative purposes, some embodiments are described below in which the disclosed techniques are used to facilitate a supply of various types of used items in various specified ways. However, those skilled in the art will appreciate that the described inventive techniques may be used in a wide variety of other situations, and that the invention is thus not limited to the specific illustrative details that are discussed.

FIGS. 1A-1D illustrate examples of techniques for facilitating a supply of used items, including various examples of shipping materials and offer information that may be provided to recipients of items. In the examples illustrated in FIGS. 1A-D, the recipient of the example ordered item (item XYZ) is an example customer (Customer ABC) of an example merchant (Merchant MMM), and Merchant MMM also act as the used item acquirer entity to attempt to re-acquire item XYZ from Customer ABC.

FIG. 1A illustrates an example of shipping material 100 that may be provided to a recipient of an item in order to enable the recipient to supply the item to a used item acquirer. The shipping material 100 in the illustrated example is part of an envelope, which is this example is included in a package to be delivered to Customer ABC from Merchant MMM along with item XYZ that was purchased from Merchant MMM. In this example, the shipping material 100 is imprinted with an offer 102 indicating that Merchant MMM is willing to buy the item back from Customer ABC for a sum of $5.00 if Customer ABC accepts the offer, which entails enclosing item XYZ in the provided shipping material 100 and mailing it by Aug. 15, 20ZZ. The shipping material 100 is further imprinted with a mailing label 104 that includes a return address 106, a destination address 108, and an indication of pre-paid postage. In this example, the return address 106 indicates the address of Customer ABC, and the destination address 108 indicates the address of a shipping location utilized by Merchant MMM to receive used items supplied by its customers.

The mailing label 104 in this example further includes a machine-readable identifier 110 that may be used for various purposes, such as to identify the contents of the envelope without opening it and to allow the movement of the envelope to be tracked. The machine-readable identifier 110 in the illustrated example is a bar code that can be scanned by a bar code reader, such as a bar code specific to this customer and item, but in other embodiments other alternative technologies may be used. For example, in some embodiments a radio frequency identifier ("RFID") tag may be included in the envelope and used to track the envelope. Such tracking of the envelope based on a machine-readable identifier or material may be employed as various times, including when the envelope is initially mailed or otherwise sent by a recipient, when the envelope is received at the destination location, and/or when the envelope is at one or more intermediate locations. In some embodiments, the machine-readable identifier or material may further be used at an intermediate location in order to intercept the envelope and redirect it, such as at a regional Bulk Mail Center (BMC) of the United States Postal Service (USPS). For example, a representative of Merchant MMM may physically retrieve the item at such an intermediate location, change the shipping information for the envelope to direct it to another destination (e.g., to direct the item to another customer who has purchased the used item, such as by printing a new shipping label and attaching it to the envelope), and send the item to the new destination (e.g., without the envelope leaving the intermediate location, such as by using cross-docking techniques to move the item from an incoming loading dock to an appropriate outgoing loading dock). In such a situation, a representative of the merchant may periodically visit each such intermediate location (e.g., every day) to identify envelopes and other packages received for the merchant that are to be forwarded to other final destinations, and may further in some embodiments carry a portable computing device to assist in the item processing, such as to identify packages of interest, to print new labels, and/or to determine appropriate final destinations (whether locally at the portable computing device and/or by communicating with a remote system to receive such information, such as via a wireless connection). Additional details related to re-directing a package from an intermediate shipping location are included in U.S. patent application Ser. No. 10/987,214, filed Nov. 12, 2004 and entitled "Dynamic Determination Of Item Returns During Transit", which is hereby incorporated by reference in its entirety.

Figure 1B:
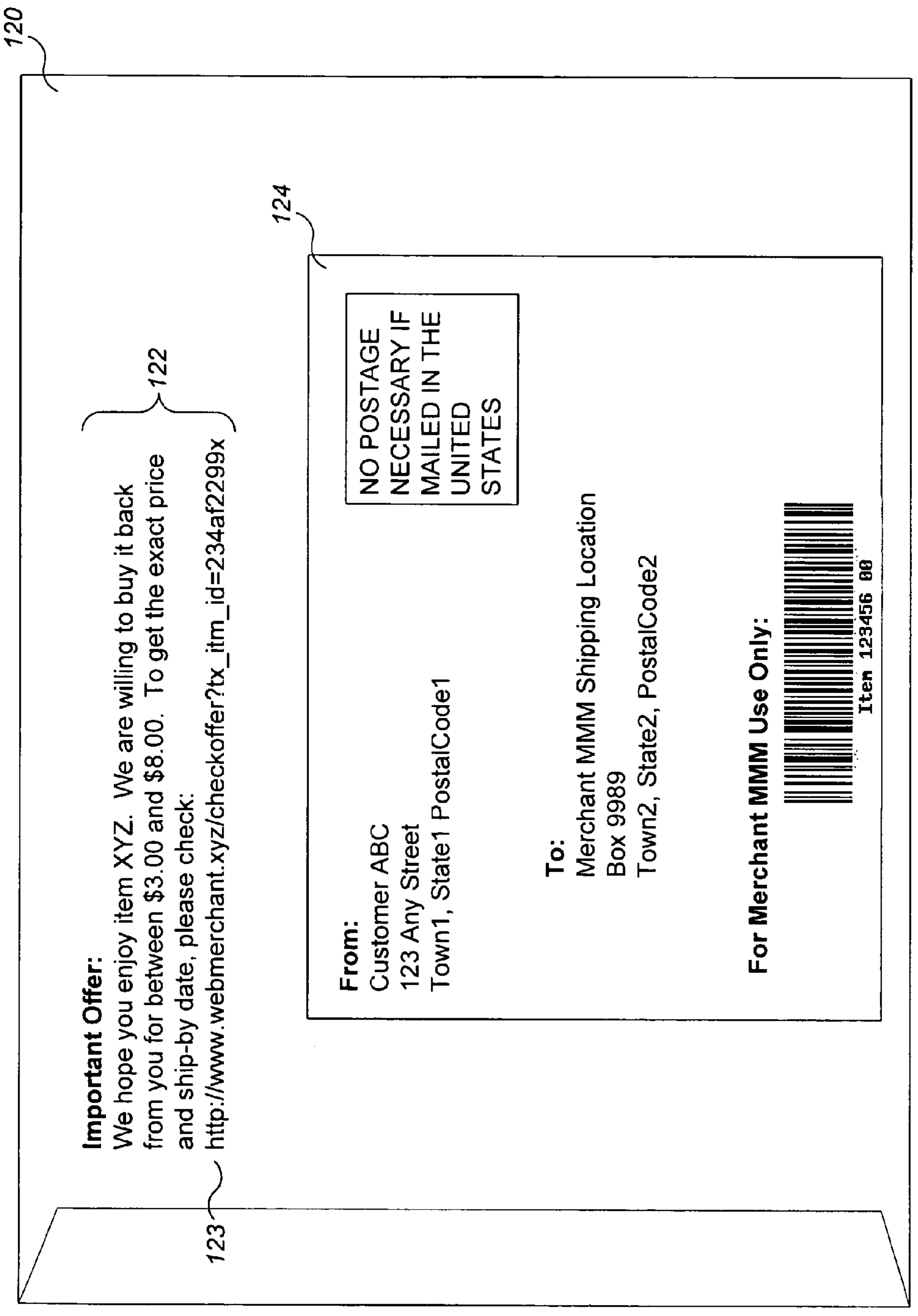

FIG. 1B illustrates an alternative example of shipping material 120 that may be provided to a recipient of an item in order to enable the recipient to supply the item to a used item acquirer. The shipping material 120 shown in FIG. 1B is similar to that shown in FIG. 1A, including having a mailing label 124 similar to mailing label 104 in FIG. 1A, but in this example the shipping material 120 includes a partially specified offer. In particular, the shipping material 120 includes an indication of a offer to Customer ABC from Merchant MMM that includes information 122 indicating that Merchant MMM is willing to buy the item back from Customer ABC for between $3.00 and $8.00. The indicated offer information further includes an example URL 123 corresponding to a Web page that the customer may access in order to obtain additional information regarding the terms of the offer, such as an exact price and ship-by date. In this manner, Merchant MMM (or other used item acquirer) may delay a decision on some offer terms from when the shipping materials are initially supplied until a time at which the customer contacts Merchant MMM as part of potentially accepting the offer, such as to base those delayed offer terms on current conditions that exist at the time when the customer contacts the merchant. In this example, the URL 123 illustrates access information that is specific to this offer for item XYZ that is being made to Customer ABC, such as may be generated at a time of preparation of the shipping material 120, so that Customer 123 may use the access information to obtain additional information regarding the offer (e.g., additional offer terms and/or other types of information about an offer). In other embodiments, the access information indicated to a recipient as part of an offer may not be specific to that recipient or offer, such as if use of the access information by the recipient causes the recipient to be prompted to provide identifying information so that appropriate offer information may be retrieved (or generated) and provided to the recipient.

In other embodiments, a URL or other type of access information (e.g., a phone number to call, an email address or IM address or other type of messaging address to which a message is to be sent, etc.) that is provided to a recipient may be used in other manners to facilitate acceptance of an offer by a recipient. For example, such access information may be provided to a recipient as some or all of the indicated offer information along with an item being delivered, and selection of the access information by the recipient or other use of the access information by the recipient may cause a variety of types of actions to be taken. For example, in some embodiments, selection or other use of access information by a recipient may indicate a binding acceptance by the recipient of an offer, such as without any further interactions by the recipient (e.g., if the results of such action are indicated to the recipient before the selection or other use of the access information occurs) and/or without any further information provided to the recipient. In other embodiments, the recipient may be provided with confirmation of the action to be taken, and/or may be prompted to take one or more additional confirmatory or other steps. Selection or other use of access information may include, for example, clicking a URL or other type of access information, entering a URL into a Web browser, dialing a telephone number, providing a password to an indicated service, etc.

In addition, in some embodiments, selection or other use of access information by a recipient may automatically initiate other actions, such as to notify a shipping company to retrieve one or more indicated items from a location of the recipient, as well as to optionally generate or prepare appropriate shipping materials and bring them to the recipient location for use with the indicated items. Alternatively, selection or other use of access information by a recipient may automatically initiate an indication to a shipping company or other company to generate or prepare appropriate shipping materials for one or more items that are for later use, such as when the recipient brings the items to a location of the shipping company or other company. If a shipping company (or other entity) obtains the one or more items from a recipient, the shipping company may further be notified by the used item acquirer of a desired destination for the items, including to send the items to one or more other recipients. In this way, privacy of the next recipient(s) is protected, since the initial recipient may not be provided with information about a next recipient (or even know that the items are being provided to another recipient).

In addition, while in some embodiments access information may be provided to a recipient along with an item being delivered, in other embodiments such access information may instead be provided to a recipient at other times, including after the item has been initially supplied to the recipient. For example, an email or other type of electronic notification (e.g., an instant message, telephone call, etc.) may be sent to the recipient with information about an offer to acquire one or more items previously provided to the recipient, such as with access information related to the offer. Such a post-acquisition offer notification may be initiated in various ways, such as by a used item acquirer based on then-current demand for an item (including a particular offer or request from a new customer for that item). The access information included in such notifications may include one or more of the previously described types of access information, such as to allow the recipient to easily accept the offer and complete the transaction by selecting or otherwise using the included access information. Furthermore, in some embodiments such a post-acquisition offer notification to a recipient may be preceded by related information that is provided to the recipient, such as information provided at the time that the relevant items for the offer are provided to the recipient (e.g., by providing the information along with the items). Such preceding information may indicate that a later actual offer may be made to the recipient, such as by providing an indication of a potential offer that cannot currently be accepted by the recipient but that may later become an actual offer (e.g., under specified conditions and/or at the discretion of one or more used item acquirers who may elect to make an actual offer).

Figure 1C:
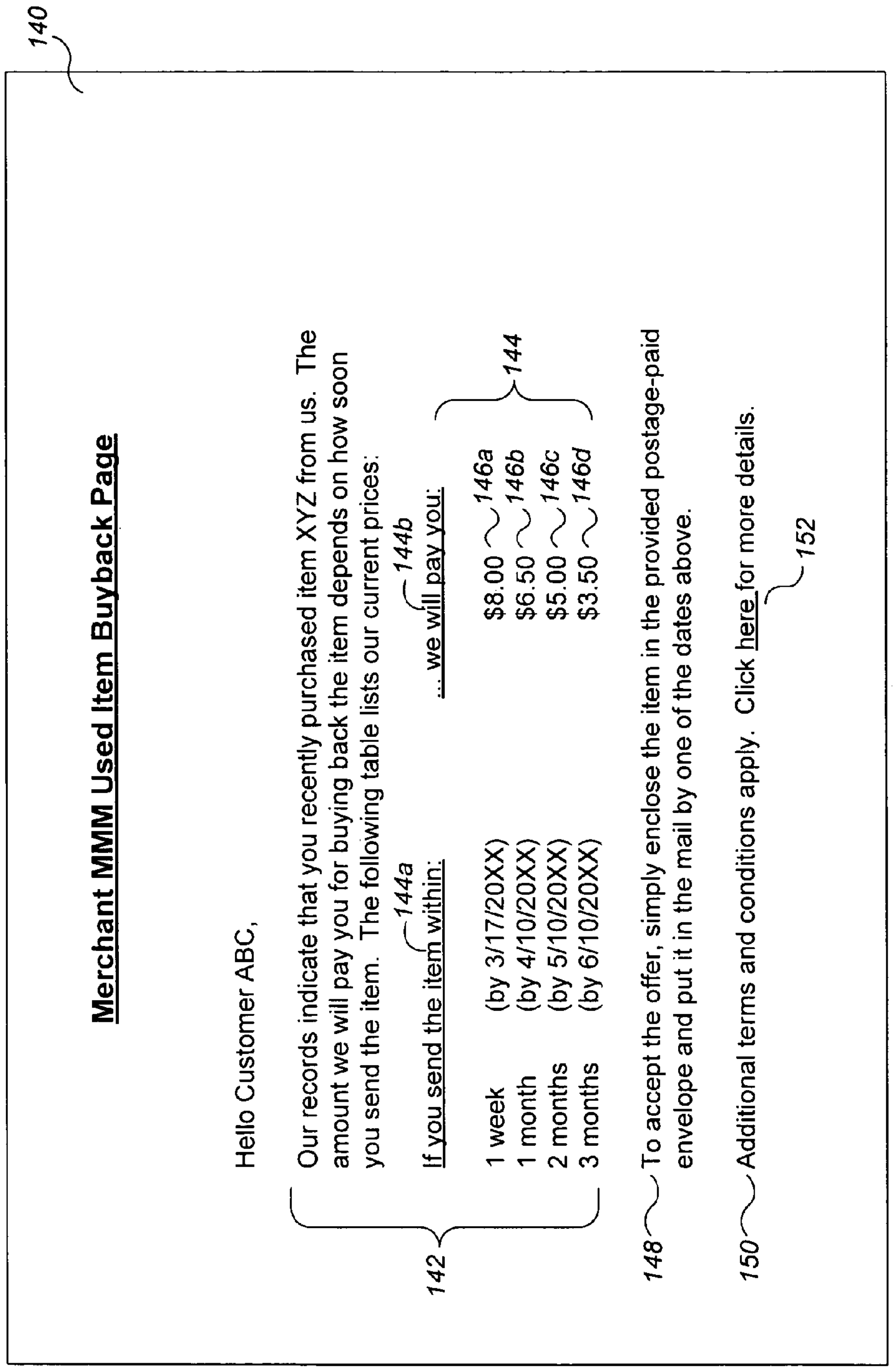

FIG. 1C illustrates example information 140 that may be supplied to a recipient to provide additional information regarding an offer to purchase a received item from the recipient. For example, the information may be provided via a Web page or other user interface screen that the recipient accesses using access information supplied to the recipient, such as if Customer ABC uses a Web browser to access the URL 123 of FIG. 1B, although in other embodiments such example information may instead be provided to the recipient along with the item. In this example, the information 140 includes various offer terms 142 that inform Customer ABC varying prices 146*a*-146*d* that will be paid for item XYZ depending on when Customer ABC sends the item. In particular, the offer terms are presented as a table 144 that includes a ship-by date column 144*a* and a price column 144*b*. For example, if the customer sends the item within one week, he/she will be paid $8.00, and if the customer sends the item after one week but within one month, he/she will be paid $6.50.

In addition, the example information 140 includes acceptance instructions 148 that describe the manner in which the user may accept the indicated offer. In the illustrated example, the acceptance instructions direct the customer to enclose the item in the provided postage-paid envelope (the shipping material 120 described with reference to FIG. 1B) and place it in the mail by one of the ship-by dates 144a of table 144, although in other embodiments the user might be prompted to enter information or otherwise provide an indication via the user interface to indicate that the offer has been accepted. Furthermore, the example information 140 includes a notice of additional terms and conditions 150 that may be obtained by following the indicated hyperlink 152. Such additional terms and conditions may include, for example, restrictions related to the condition of the item (e.g., that the item is in working order or undamaged), payment terms (e.g., that the customer will be paid within 30 days of the receipt of the item), allocation of risk terms (e.g., that the user bears the risk of the item being damaged or lost in transit), dispute resolution terms (e.g., that disputes are subject to binding arbitration), choice of law terms (e.g., that the laws of a particular state govern the current transaction), etc. In other embodiments, additional terms and conditions may be presented directly with the provided information 140, instead of on an additional user interface screen accessed by way of a hyperlink.

Figure 1D:
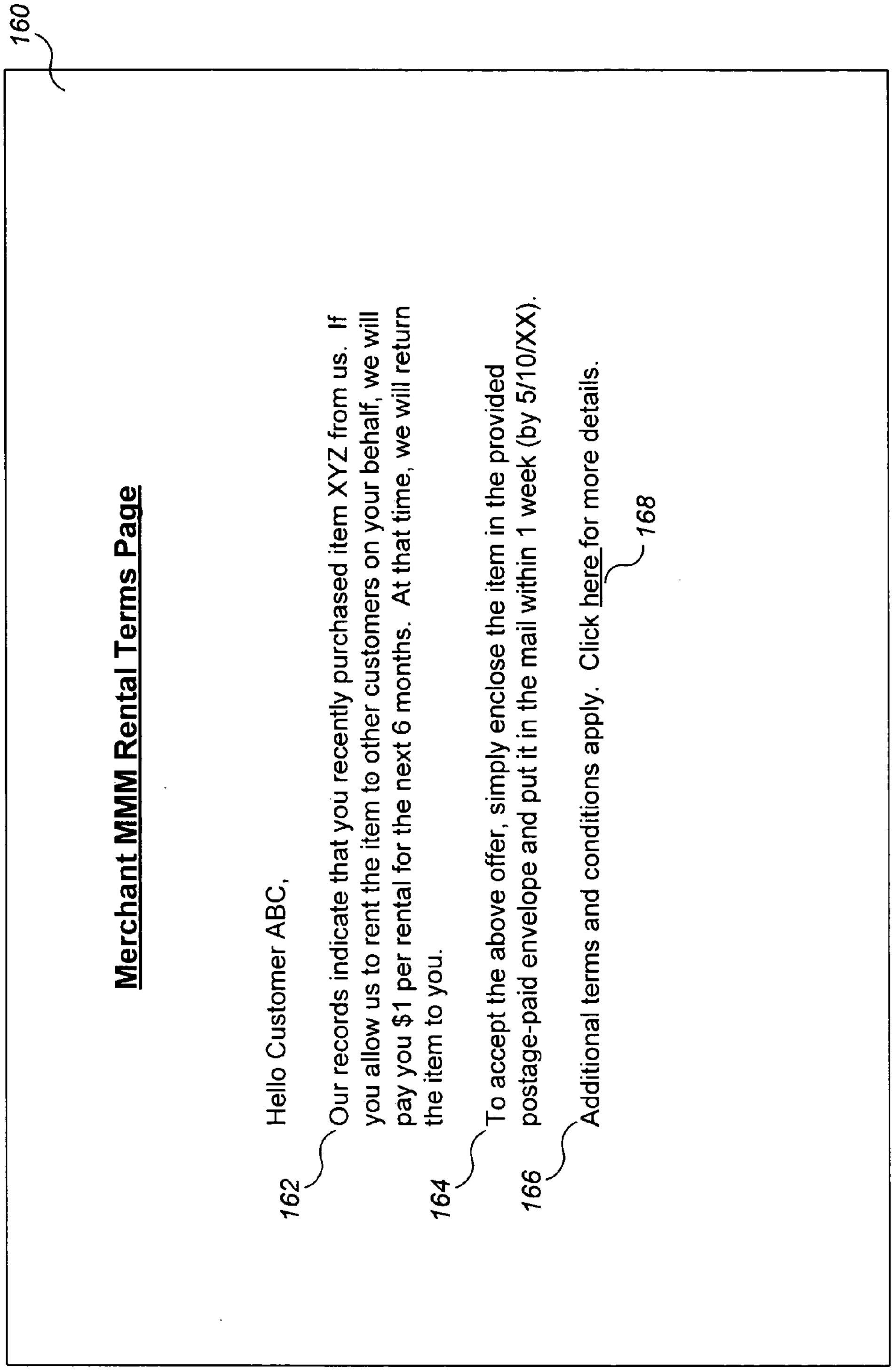

FIG. 1D illustrates alternative example information 160 that may be supplied to a recipient to provide additional information regarding an offer to temporarily acquire a received item from the recipient. For example, the information 160 may be provided via a Web page or other user interface screen that the recipient accesses, such as based on a URL that is initially supplied to the user along with the item, although in other embodiments such example information may instead be provided to the recipient along with the item. In this example, the offer indicates that if the recipient sends the item back to Merchant MMM, the merchant will rent the item to other customers and provide the recipient with compensation based on rental revenues. The displayed information includes price and duration terms 162 that indicate that for the next six months, Merchant MMM will rent item XYZ to other customers and pay Customer ABC $1.00 for each rental. At the end of the six-month term, Merchant MMM will send the item back to the customer. In addition, the displayed information includes acceptance instructions 164 that direct the user to accept the offer by enclosing the item in the provided envelope (such as, for example, the shipping material 120 described with reference to FIG. 1B) and place it in the mail by the indicated date. The displayed information also includes a notice of additional terms and conditions 166 that may be obtained by following hyperlink 168, such as previously discussed with respect to FIG. 1C.

While the prior examples have included specific types of shipping materials and offers, it will be appreciated that other types of offers and offer information may be supplied to item recipients in other ways, and that other types of shipping materials may be used.

Figure 2:
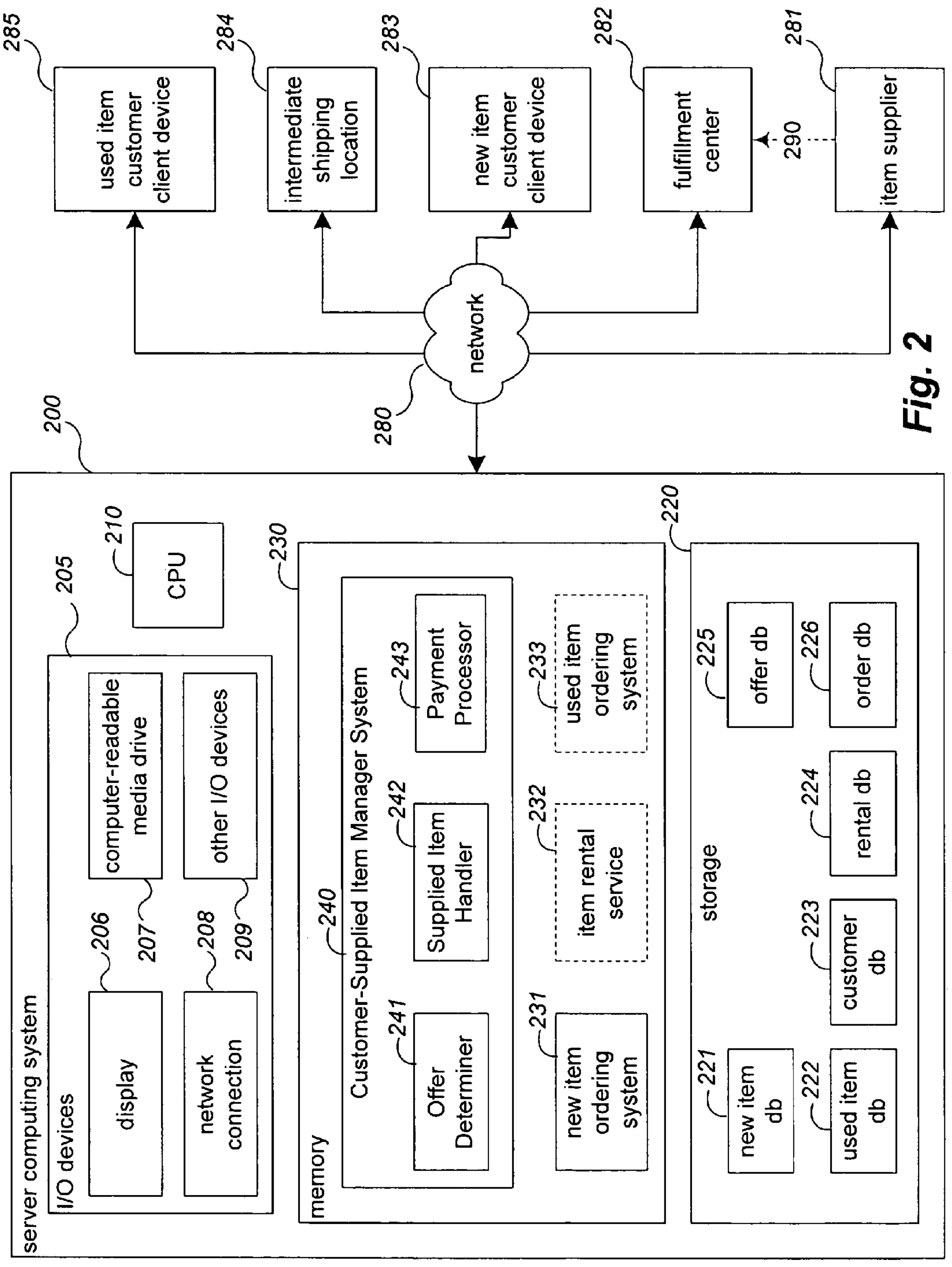
FIG. 2 is a block diagram illustrating a computing system suitable for executing an embodiment of a system for facilitating a supply of used items.

FIG. 2 is a block diagram illustrating an embodiment of a server computing system 200 that is suitable for performing at least some of the described techniques, such as by executing an embodiment of a Customer-Supplied Item Manager system 240. The server computing system 200 includes a central processing unit ("CPU") 210, various input/output ("I/O") components 205, storage 220, and memory 230, with the illustrated I/O components 205 including a display 206, a network connection 208, a computer-readable media drive 207, and other I/O devices 209 (e.g., keyboards, mice or other pointing devices, microphones, speakers, etc.).

In the illustrated embodiment, the Customer-Supplied Item Manager system 240 is executing in memory 230, as are a new item ordering system 231, an optional item rental service system 232, and an optional used item ordering system 233, with these various executing systems generally referred to herein as merchant computing systems. In this example embodiment, the Customer-Supplied Item Manager system 240 includes an Offer Determiner component 241, a Supplied Item Handler component 242, and a Payment Processor component 243. The systems executing in memory 230 may additionally utilize data stored in storage 220, as discussed in greater detail below, including a new item database 221, a used item database 222, a customer database 223, a rental database 224, an offer database 225, and an order database 226.

The server computing system 200 and its executing systems may communicate with other computing systems via a network 280 (e.g., the Internet, one or more telephone networks, etc.), such as computing systems at an item supplier 281, a fulfillment center 282, or an intermediate shipping location 284. In addition, the server computing system 200 may communicate with computing systems or other devices used by customers or other recipients of new and/or used items, such as client devices 283 of new item customers and client devices 285 of used item customers. The customer client devices 283 and 285 may take various forms in various embodiments, and may generally include any communication devices (e.g., telephones) and other computing devices capable of making requests to and/or receiving information from the merchant computing systems. In some cases, the customer client devices may run interactive console applications (e.g., Web browsers) that customers may utilize to perform various interactions, such as to place orders, request further information regarding offers, manage account settings, etc. In other embodiments, customers may interact with the merchant computing systems by way of a telephone or other communication device (e.g., to interact with an automated keypad-driven or interactive voice response ("IVR") system and/or to interact with human operators, such as via a call-center).

In this embodiment, the new item ordering system 231 is operated by a merchant to sell new items of various types to customers, although in other embodiments a single ordering system may sell both new and old items, or instead multiple ordering systems may be used to sell new items (e.g., to each sell new items of one or more distinct types). The new item ordering system 231 interacts with customers to provide them with information about items that are for sale and to receive orders for new items from such customers, with the ordered items to be delivered to the customers or other designated recipients. The interactions with the customers may occur with the customer client devices 283, and may include obtaining information about new items for sale from the new item database 221, storing and using information about customers in the customer database 223, and storing information about customer orders in the order database 226.

In the illustrated embodiment, the Customer-Supplied Item Manager system 240 is executed by the same merchant who operates the new item ordering system 231, and the Customer-Supplied Item Manager system 240 interacts with the new item ordering system 231 in order to automatically facilitate a supply of used items for the merchant. In this example, the supply of used items that are obtained may be used by the merchant to support one or more other systems of the merchant, such as the optional used item ordering system 233 and/or the optional item rental service 232, or may instead be supplied by the merchant to one or more other used item acquirers (not shown). In other embodiments, a Customer-Supplied Item Manager system may instead operate independently of any particular merchant or ordering system, such as if the Customer-Supplied Item Manager system interacts with ordering and/or fulfillment systems for multiple unrelated merchants, or is operated by a used item acquirer entity distinct from the merchant.

In the illustrated embodiment, when a customer places an order with the new item ordering system 231 for one or more new items to be delivered to a designated recipient, the Customer-Supplied Item Manager system is notified of the order. The Offer Determiner component 241 then determines for each of the new items whether to make an offer to the recipient to re-acquire the item from the recipient, with information about the decision whether to make an offer being discussed in greater detail elsewhere. If one or more offers are determined to be made to the recipient, the Offer Determiner component 241 stores an indication of the offer in the offer database 225, and directs the preparation and inclusion of appropriate shipping materials in a package containing the ordered item(s). In particular, in the illustrated embodiment the merchant uses one or more fulfillment centers to fulfill orders from customers (by obtaining 290 available items from item suppliers such as manufacturers or distributors and by packaging and sending ordered items to designated recipients), although in other embodiments orders may be fulfilled in other manners (e.g., by interacting with drop shippers). Thus, in the illustrated embodiment the inclusion of appropriate shipping materials in a package containing the ordered item(s) occurs at the fulfillment center at the direction of the Offer Determiner component of the Customer-Supplied Item Manager system. When the shipping materials or other information to be sent to a recipient for an item are created individually for that recipient and item (e.g., to print offer details specific to that recipient and item on the shipping materials or other supplemental materials included in the package with the item), the creation of that information may be performed at the fulfillment center (at the direction of the Offer Determiner component), or may instead be performed at one or more other locations (e.g., by the server computing system, such as in electronic form or by using a printer or other output device) and supplied to the fulfillment center.

If the recipient of the one or more ordered items decides, at some time after having received the item, to accept the offer from the Customer-Supplied Item Manager system to re-acquire the item, the recipient uses the provided shipping materials to send the item to the merchant (e.g., to a fulfillment center of the merchant or to an intermediate shipping location from which the shipping materials may optionally be re-directed by the merchant). In some embodiments, the provided shipping materials are pre-addressed to a destination address, as described in more detail with reference to FIGS. 1A-D, although in other embodiments the recipient may instead be directed to send the shipping materials to a specified destination at a time that the recipient is accepting or considering whether to accept the offer (e.g., via a Web page or other information accessed by the recipient, such as to send the shipping materials directly to another customer or designated recipient).

In addition, in some embodiments the recipient may be prompted to, at the time of offer acceptance or consideration, generate some or all of the shipping materials that are to be used to send the item to an indicated location (e.g., to print out a shipping label or a paper-based envelope using information provided to the recipient, such as via a Web page displayed to the recipient after the recipient accesses a URL provided to the recipient along with the offer information). Such a printed shipping label material may, for example, then be affixed by the customer to shipping materials that were previously sent to the recipient for use in sending the item if the offer is accepted, or in some embodiments to shipping materials that were used to initially deliver the item to the recipient. Additional details related to directing a customer to prepare and use such shipping materials are included in U.S. patent application Ser. No. 10/987,213, filed Nov. 12, 2004 and entitled "Dynamic Determination Of Item Returns", which is hereby incorporated by reference in its entirety. Moreover, if some embodiments recipients may be instructed or otherwise prompted to generate various types of shipping materials other than based on printed paper from a printer, such as if the recipient has one or more devices capable of manipulating other types of material (e.g., via machine tools or manufacturing robots, such as by executing instructions provided to the tools or robots via the recipient; via a 3-D copier that can construct 3-D materials by combining smaller building block materials; etc.).

If the recipient accepts an offer to send an item to the merchant, the Customer-Supplied Item Manager system is notified, and the Supplied Item Handler component 242 of the Customer-Supplied Item Manager system determines how the item is to be used. For example, if both the used item ordering system and item rental service system are available in a particular embodiment, the Supplied Item Handler component 242 may determine that the used item is to be available to one or both of those systems, and then notify the selected system(s) that the item is available (i.e., available for sale as a used item by the used item ordering system, and/or for rental by the item rental service 233). The Supplied Item Handler component 242 may be notified of the item re-acquisition by the merchant in various ways and at various times, including by an indication supplied by the recipient before the item is mailed (e.g., via a Web page or other interactive system of the merchant with which the recipient interacts), when the item is mailed (e.g., based on tracking information included on or in the shipping materials, such as if the postal service or private delivery service obtains the information and makes it available to the merchant), when the item is received at one or more intermediate shipping locations (e.g., based on tracking information included on or in the shipping materials, such as by the entity performing the shipping or operating the intermediate shipping location, or by a representative of the merchant that is present at the intermediate location), when the item is received by the merchant at a fulfillment center or other destination, etc. Moreover, if the Supplied Item Handler component 242 is notified of the item re-acquisition before the item arrives at the merchant's fulfillment center or other destination, the Supplied Item Handler component 242 may further optionally direct the item to a particular destination (e.g., to direct the recipient to send the item to a particular destination if the item re-acquisition notification occurs before the recipient sends the item, to direct an operator of an intermediate shipping location or merchant representative at the intermediate shipping location to redirect the item to a particular destination, etc.). Alternatively, the used item ordering system 233 and/or item rental service 232 may instead optionally direct the item to a particular destination under similar circumstances after being notified by the Supplied Item Handler component 242 of the item re-acquisition, such as to direct the item to another customer or designated recipient. The Supplied Item Handler component 242 may also store an indication of the used item availability in the appropriate database, such as in the used item database 222 or the rental database 224, or such actions may instead be performed by the used item ordering system 233 or item rental service 232. In addition, the Supplied Item Handler component 242 may notify other components of the merchant computing systems that the item has been received. For example, the Supplied Item Handler component 242 may notify the Payment Processor component 243, such as to initiate the delivery of payment or other compensation (e.g., store credit, award points, etc.) to the recipient that supplied the item under appropriate circumstances (e.g., after the item is sent, after the item is received, after the received item is examined or verified, after the received item is subsequently used in one or more ways, etc.).

As previously noted, the optional item rental service 232 and the optional used item ordering system 233 are examples of systems that may use used items supplied by recipients, such as to make those used items available for sale or rental to other customers. The used item ordering system 233 operates in a manner similar to that of the new item ordering system 231 described in more detail above. The item rental service 232 provides functionality to facilitate rental transactions with customers. In the illustrated embodiment, the used item ordering system 233 and the item rental service 232 are shown as computing systems operated by a single merchant. However, they may alternatively be operated by third parties on remote computing systems. Various other uses of received used items are also contemplated, including auction services, liquidators, recyclers, exporters, etc.

In addition, in at least some embodiments the Customer-Supplied Item Manager system 240 interacts with the used item ordering system 233 to make re-acquisition offers to recipients of used items, such as in a manner similar to the interactions with the new item ordering system 231. Such interactions with the used item ordering system may occur in addition to or instead of interactions with the new item ordering system. For example, the Customer-Supplied Item Manager system 240 may be notified of orders for one or more used items from customers of the used item ordering system, determine for each of the used items whether to make an offer to the recipient to re-acquire the item from the recipient, directs the preparation and inclusion of appropriate shipping materials in a package containing the ordered item(s), and assist in determines how the item is to be used.

It will be appreciated that the illustrated computing systems are merely illustrative and are not intended to limit the scope of the present invention. Computing system 200 may be connected to other devices that are not illustrated, including through one or more networks such as the Internet or via the Web, via cellular data networks (e.g. networks based on GSM, GPRS, EDGE, W-CDMA, UMTS, HSDPA CDMA2000, 1xRTT, 1xEVDO, etc.), and via other wireless data networks (e.g. Wi-Fi, WiMAX, etc.). More generally, a “client” or “server” computing system or device may comprise any combination of hardware or software that can interact and perform the described types of functionality, including without limitation desktop or other computers, database servers, network storage devices and other network devices, PDAs, cellphones, wireless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated system components may in some embodiments be combined in fewer components or distributed in additional components. Similarly, in some embodiments the functionality of some of the illustrated components may not be provided and/or other additional functionality may be available. Note also that while various items are illustrated as being stored in memory or on storage while being used, these items or portions of them can be transferred between memory and other storage devices for purposes of memory management and/or data integrity. Alternatively, in other embodiments some or all of the software systems or components may execute in memory on another device and communicate with the illustrated computing system via inter-computer communication. Some or all of the system components or data structures (e.g., portions of a database, such as one or more tables or views or portions thereof) may also be stored (e.g., as software instructions or structured data) on a computer-readable medium, such as a hard disk, a memory, a computer network or cellular wireless network or other transmission medium, or a portable media article (e.g., a DVD or flash memory device) to be read by an appropriate drive or via an appropriate connection. The system components and data structures may also be transmitted as generated data signals (e.g., by being encoded in a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
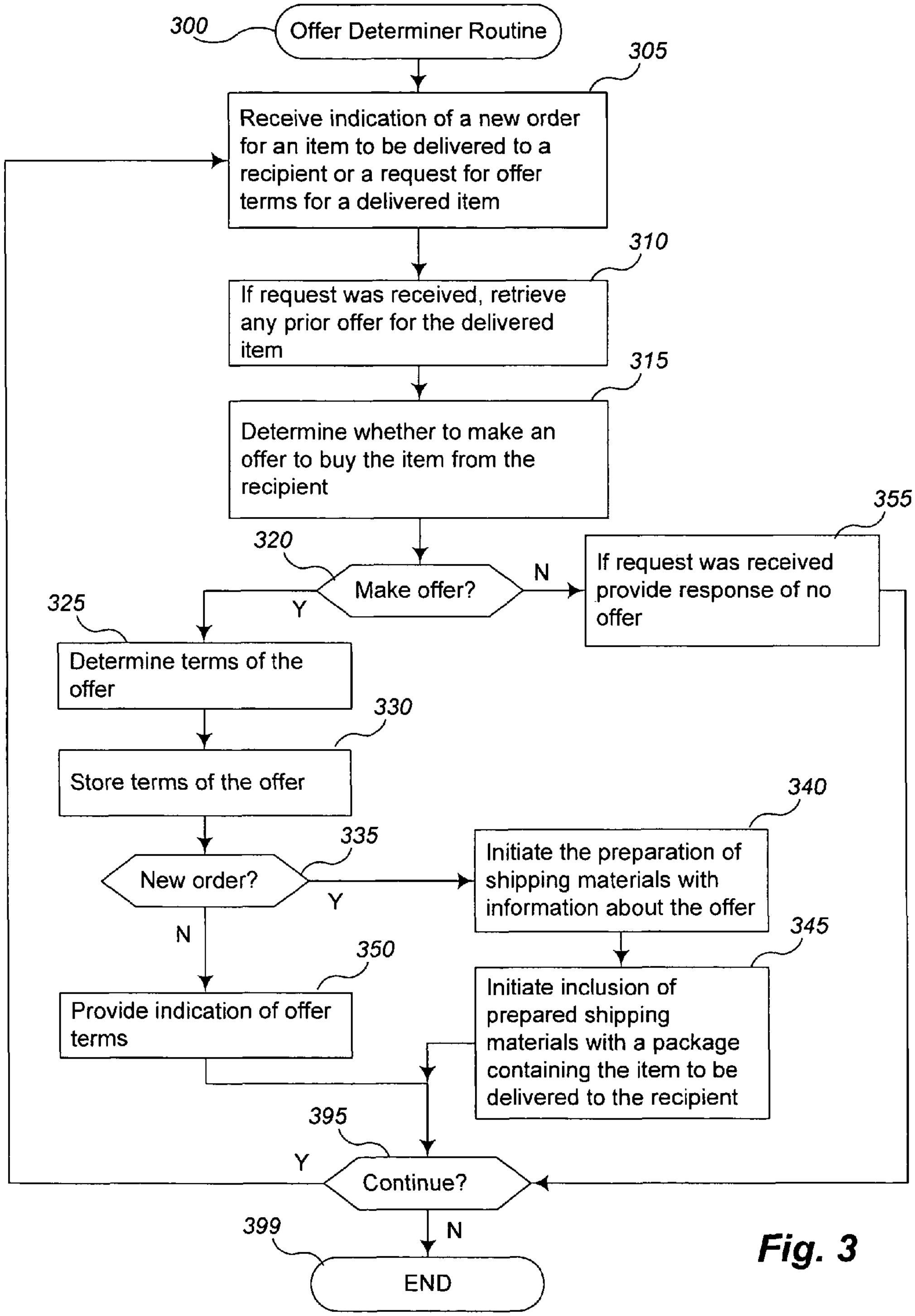
FIG. 3 is a flow diagram of an example embodiment of an Offer Determiner routine.

FIG. 3 is a flow diagram of an example embodiment of an Offer Determiner routine 300. This routine may, for example, be automatically provided by execution of the Offer Determiner component 241 of FIG. 2. The routine determines whether to make offers for items to be delivered to recipients, determines the terms of such offers to be made, facilitates the supply of the offers and related materials to the recipients, and provides requested information regarding existing offers.

The routine begins at step 305, where an indication is received of a new order for an item to be delivered to a recipient or of a request for information about an offer previously made for an already-delivered item. The routine may receive an indication of a new order from, for example, the new item ordering system 231 and/or the used item ordering system 233 previously described with respect to FIG. 2. The routine may receive a request for information regarding offer information from, for example, a customer client device 283 or 285 previously described with respect to FIG. 2. In step 310, if a request was received for information about a prior offer regarding a delivered item, the routine retrieves information regarding the prior offer for the delivered item. The routine may retrieve such information from, for example, the offer database 225 described with reference to FIG. 2. In step 315, the routine then determines whether to currently make an offer to purchase or otherwise acquire the item from the recipient. In some embodiments, the routine will make offers for all items of one or more particular types, such as to purchase any music CDs. In other embodiments, the determination may be based on one or more other factors, such as characteristics of the customer and/or recipient, or information about the specific item. Additional details regarding the decision of whether or not to make an offer in a particular case is provided elsewhere. In addition, the determination of whether to currently make the offer is made in the illustrated embodiment not only for new item orders, but also with respect to whether to maintain or revise a previously made offer, such as to not currently make an offer if the prior offer has expired or if other related conditions have changed.

If the routine determines in step 320 not to make an offer, the routine proceeds to step 355 to provide a response indicating that no offer is currently being made (or, if an offer had previously been made, that the original offer has been withdrawn, such as due to expiration of the prior offer and/or changes in current market conditions). If the routine determines to make an offer in step 320, the routine proceeds to step 325 and determines the terms of the offer. The determination of the terms of the offer may be based on various factors, including the current supply and/or demand for the ordered item, information about the recipient, etc. Such information may be obtained by the routine from related system components, such as the used item ordering system 233, the used item database 222, the customer database 223, etc. In addition, in some cases the routine may determine not to completely specify the terms of the offer for some or all items, such as to provide for flexibility based on later changes in market conditions. If a request for information about a previous offer has been received, the determination of offer terms may include selecting the prior terms, altering prior terms based on current conditions, and/or newly specifying some offer terms that were not initially supplied for a partially specified offer. In step 330, the routine stores the current terms of the offer, such as in the offer database 225 of FIG. 2.

In step 335, the routine determines whether the indication in step 305 was for a new order for an item. If so, the routine proceeds to step 340 and initiates the preparation of shipping materials with information about the offer, such as by notifying a fulfillment center or other system that will generate those shipping materials. In step 345, the routine then initiates the inclusion of the prepared shipping materials in a package containing the item that is to be delivered to the recipient, such as by notifying a fulfillment center that will perform the packaging for shipment to the recipient. If it is instead determined in step 335 that an indication of a new order was not received in step 305, the routine proceeds to step 350 and provides an indication of the current determined offer terms. This step may occur when, for example, an incompletely specified offer was previously made, and the recipient is currently requesting an indication of the current offer terms (e.g., by requesting a Web page that the routine generates).

After steps 345, 350, or 355, the routine continues to step 395 and determines whether to continue. If so, the routine returns to step 305, and if not continues to step 399 and ends.

Figure 4:
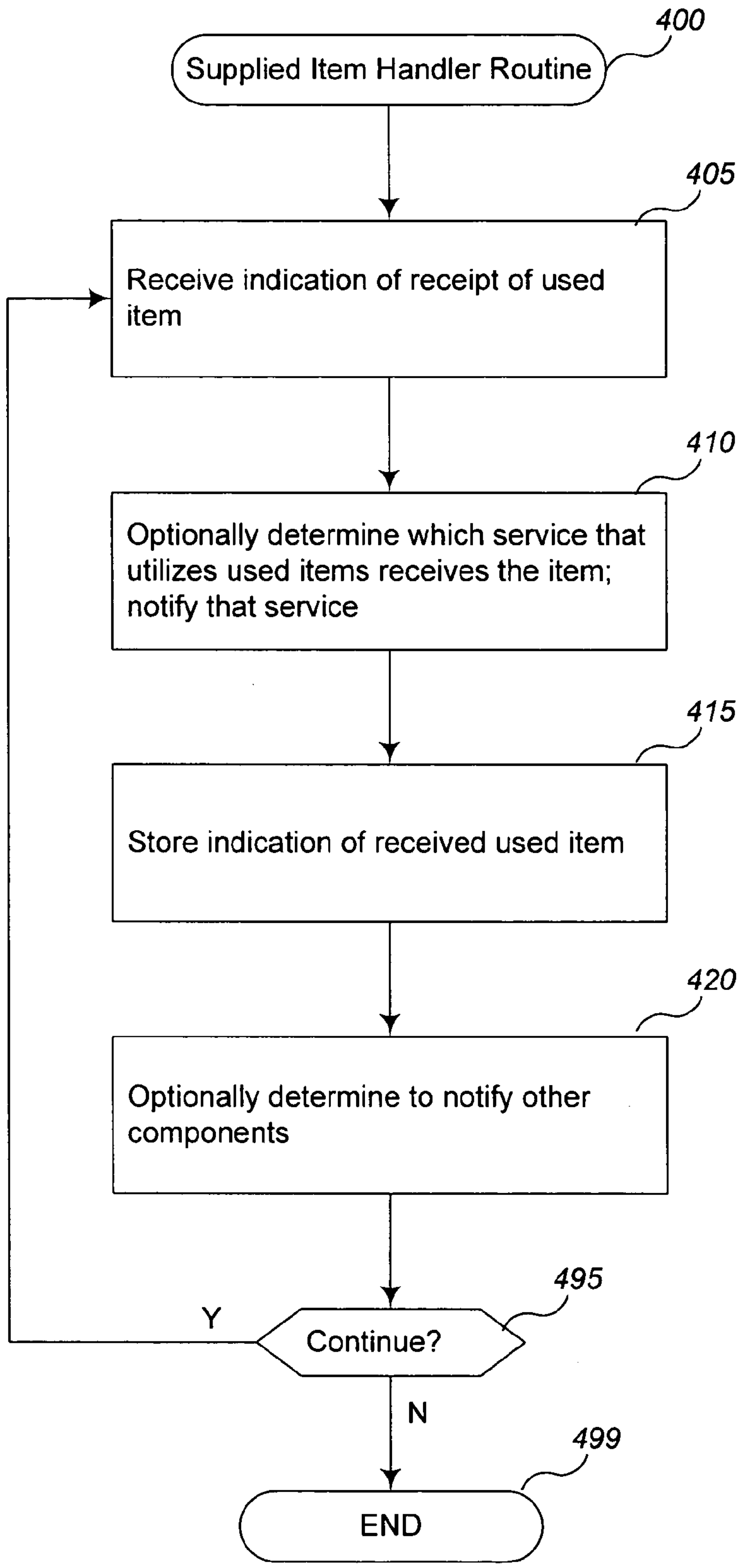
FIG. 4 is a flow diagram of an example embodiment of a Supplied Item Handler routine.

FIG. 4 is a flow diagram of an example embodiment of a Supplied Item Handler routine 400. This routine may, for example, be automatically provided by execution of the Supplied Item Handler component 242 of FIG. 2. The routine determines how to handle items that are re-acquired based on offers to item recipients.

The routine begins at step 405, where an indication is received of actual or upcoming receipt of a used item, such as an indication from the destination when the item is received, an indication while the item is in transit (e.g., from a shipping service when the package containing the item is received or is in transit, such as at an intermediate location), or an indication from a recipient who is about to send the item. In step 410, the routine optionally determines the service that should be given use of the item, such as if multiple such services are available, and notifies that service. For example, the routine may determine that the received item may be utilized by the item rental service 232 and/or the used item ordering system 233 described with reference to FIG. 2, and notify one or both of those services of the item. In step 415, the routine next stores an indication of the item, such as in the rental database 224 and/or the used item database 222 of FIG. 2, although in other embodiments the receiving system may instead store such indications. In step 420, the routine then optionally determines to notify other components, such as the Payment Processor component 243 of FIG. 2 in order to provide payment to the recipient or otherwise satisfy any terms of the offer. In step 495, the routine determines whether to continue. If so, the routine returns to step 405, and if not continues to step 499 and ends.

As previously noted, offers may be determined and communicated to item recipients in various ways in various embodiments. For example, the decision whether to make an offer to acquire a given item from a recipient may be determined in various ways. In some embodiments, the decision whether to make an offer may be based at least in part on actual or predicted market demand and/or supply for a particular item. For example, some embodiments may make offers only for items that have an actual or expected sales volume in excess of a predetermined threshold, or that exceeds an actual or expected supply by at least a predetermined threshold. Alternatively, in some embodiments queues may exist for some items that indicate customers who are waiting for a used copy of the item to become available, and the decision as to whether to make an offer and/or what price is offered may be based on whether such a queue exists for a current item under consideration (e.g., to make an offer only if at least one customer has made a commitment to purchase or indicated an interest in the item, and/or to offer a price to the recipient that is based on a price offered by one or more other customers or to which such other customer(s) have committed to make a purchase). In addition, the decision whether to make an offer to acquire a given item from a recipient may be based on the properties of the item itself. For example, in some embodiments offers may be made for all items of a particular type or category, such as based on the medium of the item (e.g., tape, compact disk, digital video/versatile disk ("DVD"), printed matter, etc.) and/or the subject matter of the item (e.g., whether the content is fiction or non-fiction, is of a particular genre, is instructional or entertainment, is music or film, is a documentary, etc.). Furthermore, in some embodiments offers may be made based at least in part on the price of the item, such as to not make offers to acquire items with prices below a pre-determined threshold since the potential revenue stream from re-selling or renting the items may not be sufficiently substantial. Other embodiments may make consider a variety of other factors when determining whether to make an offer, including, but not limited to, weight, size, reliability, age, manufacturer, distributor, etc. Some embodiments may base a decision whether to make an offer to acquire a given item on properties of the recipient and/or the customer that ordered the item. For example, to reduce the incidence of fraud, some embodiments may elect to only make offers to recipients that are also customers, or to recipients about which a minimum threshold of information is known (e.g., credit card number, bank account number, social security number, etc.). In addition, some embodiments may track the prior actions of a given customer or recipient and use such information when deciding whether to make an offer. For example, some embodiments may elect not to make offers to a recipient who has in the past provided non-conforming (e.g., damaged, inoperative, misidentified, etc.) items. Alternatively, some embodiments may prefer to make offers to recipients who have in the past accepted at least a certain number or percentage of offers, or recipients who have used proceeds from the offers to acquire other items from the merchant or other used item acquirer entity.

In some embodiments, the price term of an offer to purchase an item from a recipient may be determined in various ways. For example, the price term may be determined by a pre-determined percentage (e.g., 15%) of the retail or wholesale price of the item when new or used. In other embodiments, the price term may be determined by reference to the actual or predicted market for a particular item. For example, a newly released DVD of a feature film may be predicted to be a top seller, based on its performance in the theaters, and a higher price may be offered for it than for other feature film DVDs. Alternatively, the merchant may know (e.g., because the merchant operates a used item ordering service) that a particular DVD sells quickly at a relatively high price, and therefore offer a higher price for it than for other feature film DVDs. In other embodiments, the price term may be linked to the current price as determined by an auction (e.g., English auction, Dutch auction, reverse auction, etc.) for the same or similar items. In addition, the price term may be based in whole or in part on characteristics of the recipient and/or the customer that ordered the item. For example, some embodiments may offer recipients who have not previously accepted offers higher prices in order to encourage such recipients to become suppliers, or offer lower prices to recipients if they are expected to have a higher likelihood of fraud or a greater likelihood to accept the offer. In addition, the price term need not be fixed at the time of the offer, such as if it is instead determined at the later time of acceptance or later time of resale (or other disposition) after the item is re-acquired. For example, a given offer may indicate that the price paid to the supplier will be a fixed percentage (e.g., 70%) of the price at which the merchant can resell the item. In other embodiments, a given offer may indicate that the price paid to the supplier will be the price at which the merchant can resell the item minus a pre-determined commission (e.g., $3.00). Alternatively, an offer price may be based upon a mutually agreed-upon, third-party source of prices on the date of shipment, receipt, resale, etc.

In some embodiments, the length of time that an offer is held open may be determined in various ways. Some embodiments may take into account historical patterns of market activity (e.g., elasticity and/or stability of demand for a particular item) to determine offer duration. In addition, some embodiments may consider predicted market conditions when determining offer duration. For example, if demand for a particular used item is predicted to peak (e.g., because of the arrival of the holiday shopping season), some embodiments may elect to time the duration (as well as possibly the number of offers made) to help guarantee a robust supply of used items to meet the predicted demand.

Offers may also be communicated to recipients in various ways in various embodiments. As previously described, in some embodiments all or part of the offer may be directly printed on or otherwise placed (e.g., via a label) on shipping materials enclosed along with the item when it is packaged for shipment. In other embodiments, the offer may be presented separately from the shipping materials, such as on a loose-leaf notice that is enclosed with the packaged item. Also, while the offer may in some embodiments be communicated to the recipient in a manner that is substantially contemporaneous with the delivery or other providing of one or more items corresponding to the offer (whether in a manner that is physically together with the items, or instead using an alternative communication mechanism such as email, instant messaging, telephone, display on an accessed Web page, etc. that takes place at a time near to the time of the providing of the items), the offer may in other embodiments be communicated to the recipient substantially prior or subsequent to the delivery of the item. For example, shipping materials may be shipped separately to the recipient, and an offer may similarly be separately supplied in a variety of ways (e.g., electronically, such as via email and/or text message, on a paper letter, via phone, via fax, etc.).

Various mechanisms may also be used to supply items to recipients and to obtain items from recipients. For example, while the described techniques are used in some embodiments with items that are shipped or otherwise delivered to recipients, item re-acquisition offers and/or corresponding shipping materials may also be supplied in some embodiments to recipients who physically retrieve the items (e.g., by purchasing them from a brick-and-mortar retailer, or retrieving the items from a distribution location), such as by providing the offers and/or shipping materials to such recipients along with the items. Similarly, while the described techniques are used in some embodiments to enable recipients to ship or otherwise have items be delivered to a used item acquirer entity, in other embodiments the recipients may instead physically take the items to a specified location, such as if they are provided offer information but not corresponding shipping materials. For example, the specified locations may be indicated to the recipients as part of the information initially supplied to the recipients along with the items, or may instead be dynamically indicated to the recipients at the time of offer consideration or acceptance (e.g., via user-selectable access information provided to the recipients). Items being sent from recipients to a used item acquirer entity may also be routed through an intermediate shipping location from which the items are tracked (e.g., by scanning a bar code on the shipping materials or identifying an RFID tag), and potentially redirected to a new address (e.g., by applying a new address label) without ever being unpackaged, such as to be sent to a new recipient. In at least some such embodiments, additional steps may be taken to help ensure that the package contains appropriate items, such as by performing an automated weight check or otherwise conducting an examination or inspection that may or may not involve opening the package. Also, as previously noted, in some embodiments a recipient of an item that accepts a re-acquisition offer may be directed to ship the item directly to another recipient, such as by obtaining the address for the other recipient from a Web page or other information resource, or by the used item acquirer entity supplying shipping materials to the initial recipient at the time of acceptance that are pre-addressed to the other recipient.

In some embodiments, recipients who accept item re-acquisition offers may be compensated in various ways, such as with one or more sums of money using a variety of payment mechanisms (e.g., electronic funds transfer, credit card transaction, check, a stored value card, etc.). In other cases, a recipient who supplies an item will be compensated in other ways, including receiving store credit with one or more merchants, reward points redeemable at one or more merchants, etc.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

determining, by one or more configured computing systems, and before delivery of a purchased item to an indicated recipient, an offer to be made to the recipient for the recipient to perform a subsequent sale of the item after the delivery;

delivering to the recipient shipping materials and an indication of the offer along with the item, the shipping materials being for use by the recipient in shipping the item if the offer is accepted by the recipient; and after the delivering to the recipient, receiving an indication that the offer has been accepted by the recipient, and facilitating provision of compensation to the recipient in accordance with the offer.

2. The method of claim 1 wherein the purchased item is a new items, wherein the one or more configured computing systems are operated by a merchant that sells new items to customers, and wherein the method further comprises reacquiring the item from the recipient after the offer is accepted by the recipient and after the item has been used by the recipient, and using the reacquired item by the merchant as at least one of a rental item and a used items for sale.

3. The method of claim 1 wherein the purchased item is a used item, and wherein the one or more configured computing systems are operated by a merchant that sells used items to customers.

4. The method of claim 1 wherein the purchased item is one of a CD and a DVD.

5. The method of claim 1 wherein the determined offer includes a time period during which the offer is valid and a purchase price that indicates an amount of money that will be paid to the recipient if the recipient accepts the offer during the time period.

6. The method of claim 1 wherein the determined offer includes one or more terms that are determined before delivery of the item in a manner based on current market conditions at a time of determining the terms, the current market conditions including at least one of actual current demand for the item, expected future demand for the item, actual current supply of the item, and expected future supply of the item.

7. The method of claim 1 wherein the determined offer includes a determined price to be paid to the recipient based on a current price for used copies of the item.

8. A non-transitory computer-readable medium whose contents configure a computing device to perform a method, the method comprising:

receiving an indication of one or more items to be provided to a recipient;

determining, by the configured computing device and before a time of providing one or more items to a recipient, that an offer is to be indicated to the recipient at the time of providing the one or more items to the recipient, the offer including one or more terms for subsequent acquisition of at least one of the items from the recipient that will take effect upon later acceptance of the offer by the recipient at a second time after the providing of the one or more items to the recipient, the offer further having associated materials for use by the recipient if the recipient later accepts the offer; and initiating providing the offer to the recipient.

9. The non-transitory computer-readable medium of claim 8 wherein the initiating providing of the offer to the recipient includes delivering to the recipient an indication of the offer along with shipping materials as part of the providing of the one or more items to the recipient, the shipping materials being for use by the recipient in supplying the item to an indicated destination if the offer is later accepted by the recipient.

10. The non-transitory computer-readable medium of claim 9 wherein the offer includes a price term, and wherein the method further comprises providing compensation to the recipient based at least in part on the price term after the recipient accepts the offer.

11. The non-transitory computer-readable medium of claim 8 wherein the determining that the offer is to be indicated to the recipient includes determining at least one of the one or more terms for the offer, and wherein the initiating providing of the offer includes indicating the determined terms for the offer.

12. The non-transitory computer-readable medium of claim 8 wherein the initiating providing of the offer includes providing access information to the recipient that when later used by the recipient causes additional information about the offer to be provided to the recipient.

13. The non-transitory computer-readable medium of claim 12 wherein the additional information includes at least one term of the offer that is determined after use by the recipient of the access information.

14. The non-transitory computer-readable medium of claim 8 wherein the configured computing device is operated by a merchant, and wherein the initiating providing of the offer includes providing access information to the recipient that when later used by the recipient initiates retrieval of the at least one items from the recipient without further interaction by the recipient with the merchant.

15. The non-transitory computer-readable medium of claim 8 wherein the initiating providing of the offer includes providing access information to the recipient that when used by the recipient initiates preparation of shipping materials for use by the recipient in supplying the at least one items to an indicated destination.

16. The non-transitory computer-readable medium of claim 15 wherein the shipping materials include materials showing the indicated destination that are to be affixed to other materials previously provided to the recipient as part of the providing of the one or more items to the recipient.

17. The non-transitory computer-readable medium of claim 15 wherein the shipping materials include materials showing the indicated destination that are to be affixed to shipping materials previously used to provide the at least one items to the recipient.

18. The non-transitory computer-readable medium of claim 8 wherein the computer-readable medium is a memory of the configured computing device, and wherein the contents are software instructions that when executed program the configured computing device to perform the method.

19. A computing device, comprising:

a processor;

a first module that is configured to, when executed by the processor, and for an acquisition of one or more items by a customer, determine an offer that is to be made to the customer along with delivery of the one or more items to the customer, the determining of the offer being performed before the delivery of the one or more items to the customer, the offer being for a subsequent acquisition of at least one of the one or more items from the customer after the delivery and after use by the customer of the at least one item;

a second module that is configured to, when executed by the processor, provide shipping materials and an indication of the determined offer to the customer, the shipping materials being for use by the customer in supplying the at least one item to an indicated destination if the customer later accepts the determined offer; and a third module that is configured to, when executed by the processor, and after receiving an indication that the determined offer has been accepted by the customer, facilitate provision of compensation to the customer based on the determined offer.

20. The computing device of claim 19 wherein the first module is an offer determiner module, the second module is a supplied item handler module, and the third module is a payment processor module, and wherein the first, second and third modules each include software instructions for execution in memory of the computing device.

* * * * *

UNITED STATES PATENT AND TRADEMARK OFFICE

CERTIFICATE OF CORRECTION

PATENT NO. : 8,266,008 B1
APPLICATION NO. : 13/289960
DATED : September 11, 2012
INVENTOR(S) : Hilliard Bruce Siegel et al.

It is certified that error appears in the above-identified patent and that said Letters Patent is hereby corrected as shown below:

On the Title Page Item (56):
"“Evolution of an Envelope,” Business 2.0 Magazine, March 16, 2006, retrieved January 16, 2008, from http://money.cnn.com/magazines/busi-ness2/business2_archive/2006/..., 1 page.”
Should read, --“Evolution of an Envelope,” Business 2.0 Magazine, March 16, 2006, retrieved January 16, 2008, from http://money.cnn.com/magazines/business2/business2_archive/2006/..., 1 page.--.

In the Claims:
Column 17, Line 31, Claim 2:
“new items, wherein the one or more configured computing” should read, --new item, wherein the one or more configured computing--.

Column 17, Line 37, Claim 2:
“least one of a rental item and a used items for sale” should read, --least one of a rental item and a used item for sale--.

Signed and Sealed this
Second Day of July, 2013

Teresa Stanek Rea
*Acting Director of the United States Patent and Trademark Office*